(12) United States Patent
Houseberg

(10) Patent No.: US 6,932,202 B2
(45) Date of Patent: Aug. 23, 2005

(54) MULTI-COMPARTMENT STORAGE DEVICE

(75) Inventor: Denise M. Houseberg, Frisco, TX (US)

(73) Assignee: Marketexpo, Inc., Carrollton, TX (US)

( * ) Notice: Subject to any disclaimer, the term of this patent is extended or adjusted under 35 U.S.C. 154(b) by 0 days.

(21) Appl. No.: 10/326,086

(22) Filed: Dec. 23, 2002

(65) Prior Publication Data

US 2004/0118650 A1 Jun. 24, 2004

(51) Int. Cl.[7] .................................. A45C 5/12; A45C 13/00
(52) U.S. Cl. ............................ 190/29; 190/5; 190/31; 190/33; 190/109; 190/110; 206/425; 220/521
(58) Field of Search ......................... 206/425; 312/184; 190/3, 6, 13 R, 29, 33, 11, 109, 110, 111, 5, 31; 220/521, 522, 524, 543–546, 548

(56) References Cited

U.S. PATENT DOCUMENTS

| | | | | |
|---|---|---|---|---|
| 87,591 A | * | 3/1869 | Rice | 312/184 |
| 128,925 A | * | 7/1872 | Taylor | 190/29 |
| 195,167 A | * | 9/1877 | Reynolds | 211/51 |
| 213,040 A | * | 3/1879 | Duryee | 206/425 |
| 278,580 A | * | 5/1883 | Michelson | 190/29 |
| 510,743 A | * | 12/1893 | Warren | 190/31 |
| 732,670 A | * | 6/1903 | Watkins et al. | 190/13 R |
| 749,120 A | * | 1/1904 | Weir | 312/234 |
| 762,636 A | * | 6/1904 | Janik | 190/13 H |
| 838,621 A | * | 12/1906 | Hawley et al. | 190/13 H |
| 869,614 A | * | 10/1907 | Bennett | 211/169.1 |
| 947,940 A | * | 2/1910 | Rangnow | 190/13 R |
| 953,815 A | * | 4/1910 | Boyd | 190/13 R |
| 1,147,918 A | * | 7/1915 | Bartlett, Jr. | 190/13 C |
| 1,217,243 A | * | 2/1917 | Tucker et al. | 312/184 |
| 1,520,044 A | * | 12/1924 | Wilt | 190/13 R |
| 1,533,856 A | * | 4/1925 | Harrison | 190/19 |
| 1,637,206 A | * | 7/1927 | Weeks | 190/28 |
| 1,818,525 A | * | 8/1931 | Perez | 190/3 |
| 1,927,347 A | * | 9/1933 | Lee | 312/321 |
| 1,954,913 A | * | 4/1934 | Basque | 190/13 R |
| 2,001,157 A | * | 5/1935 | Ritter, Jr. | 190/13 R |
| 2,211,660 A | * | 8/1940 | Kidd et al. | 312/231 |
| 2,385,910 A | * | 10/1945 | Bracken | 190/13 R |
| 2,541,890 A | * | 2/1951 | Schaperkotter et al. | 312/222 |
| 2,789,562 A | * | 4/1957 | Norris, Sr. | 220/539 |
| 3,164,430 A | * | 1/1965 | Beem et al. | 312/234.4 |
| 3,456,994 A | * | 7/1969 | Sullivan | 312/184 |
| 3,614,185 A | * | 10/1971 | Splan | 312/184 |
| 3,856,190 A | * | 12/1974 | Mole et al. | 223/94 |
| 3,904,003 A | * | 9/1975 | Margerum | 190/11 |
| 4,505,388 A | * | 3/1985 | Solomon | 206/425 |
| 4,529,092 A | * | 7/1985 | Swingley, Jr. | 206/593 |
| 4,530,176 A | * | 7/1985 | Rejwan | 40/359 |
| 4,542,777 A | * | 9/1985 | Benson | 220/522 |
| 4,726,635 A | * | 2/1988 | Rariden et al. | 312/184 |
| 4,738,340 A | * | 4/1988 | Crespi | 190/18 R |
| 4,807,760 A | * | 2/1989 | Sussman | 206/581 |
| 4,966,258 A | * | 10/1990 | Hawley | 190/4 |
| 5,088,801 A | * | 2/1992 | Rorke et al. | 312/184 |
| 5,178,246 A | * | 1/1993 | Kramer | 190/109 |
| 5,815,903 A | * | 10/1998 | Foster et al. | 29/401.1 |
| 6,145,677 A | * | 11/2000 | Corniel | 211/105.1 |

FOREIGN PATENT DOCUMENTS

| | | | | |
|---|---|---|---|---|
| DE | 3602216 A1 | * | 2/1987 | A45C/15/00 |
| FR | 2559352 A1 | * | 8/1985 | A47C/9/10 |

\* cited by examiner

*Primary Examiner*—Sue A. Weaver
(74) *Attorney, Agent, or Firm*—Buchanan Ingersoll PC (57) ABSTRACT

A multi-compartment storage device includes a base portion and a lid for storing various items, such as photographs, recorded media, memorabilia and the like. The storage device includes at least three storage sections for holding various items. The first storage section is disposed at a base of the device. A second storage section stores hanging items. The second storage section includes at least one support member for suspending the hanging items. A third storage section is disposed above the second storage section, and is designed to store other types of materials, such as recorded media and the like.

17 Claims, 6 Drawing Sheets

MULTI-COMPARTMENT STORAGE DEVICE

BACKGROUND OF THE INVENTION

A. Field of the Invention

The present invention relates to a multi-compartment storage device. More particularly, the present invention relates to a multi-compartment storage device that houses photographs, recorded media and memorabilia.

B. Description of the Related Art

There are many types of things that memorialize events during a person's life. A typical way to memorialize an event is to take a picture or to record a video. Other memorabilia may be collected throughout one's life to remember special or key events of a person's life. Typically, these items are stored in various locations throughout a person's home.

For example, some photographs may be displayed in photo albums. However, for those pictures that are not displayed in albums, these pictures are typically stored away in boxes, drawers, or the like, which do not allow for easy access or simple organization. In addition, other items, such as keepsakes, typically do not have a place where they are permanently stored. Therefore, there is a need in the art for a multi-compartment storage device that can organize and permanently store photographs, keepsakes, and the like. In addition, there is a need in the art for a multi-compartment storage device that is aesthetically pleasing, which can be stored in a family's living room.

BRIEF SUMMARY OF THE INVENTION

In a first aspect, the present invention provides a multi-compartment storage device includes a first storage section disposed at a base of the device. A second storage item is provided which stores hanging items. The second storage section includes at least one support member for suspending the hanging items. A third storage section is disposed above the second storage section.

In a further aspect, the present invention provides a trunk for storing items, including a housing having a base portion and a lid. A drawer is disposed in the base portion of the housing. At least one support member for storing hanging items is disposed above the drawer and below the lid.

In yet another aspect, the present invention provides a storage device including a housing having a base portion and a lid. A scalloped rail is disposed about an inner perimeter of an upper end of the base portion. The scalloped rail stores hanging items thereon.

DETAILED DESCRIPTION OF THE INVENTION

In accordance with the present invention, a multi-compartment storing device will be described below. The storage device of the present invention provides a decorative yet functional heirloom product for permanent photo storage and the like. It allows for other items, such as recorded media, memorabilia, keepsakes and the like to be organized and stored. Because of the decorative aspect of the storage device of the present invention, it can be passed on to generations as an inheritable heirloom.

In one embodiment, the storage device is shaped as a trunk. As such, the trunk can act as a storage device, while also providing a decorative piece of furniture. The trunk is made from wood or wood-like material, such as MDF. The exterior may be optionally made with different materials, such as rattan, faux animal hide, leather, metal and the like. However, the storage device may take other shapes. The trunk can sit in a pedestal stand or be flat bottomed, depending on design preference. Optionally, the trunk may include a plaque to be permanently affixed thereon, which can be engraved with a family name or other identification.

Figure 1:
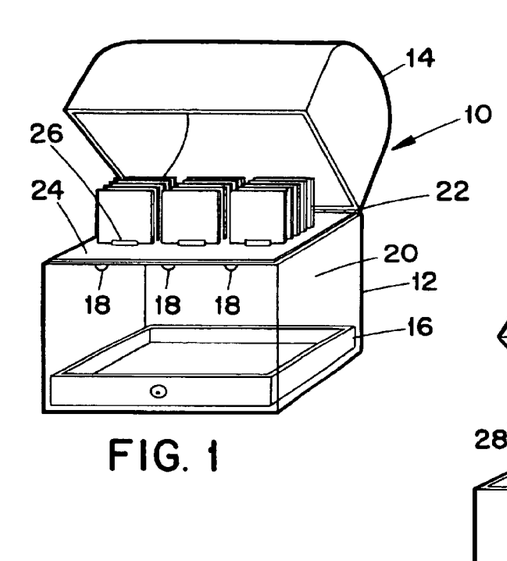
FIG. 1 is a perspective view of a first embodiment of the storage device of the present invention.

With reference to FIG. 1, a first embodiment of the storage device 10 of the present invention is illustrated. Storage device 10 includes a base portion 12 with a lid 14 connected thereto. Preferably, the lid 14 is hinged to the base portion 12. However, the lid 14 may be connected to base portion in other ways as known in the art or may be removably connected as is also known in the art, depending on design preference. For example, the lid 14 need not be hinged to the base portion, but rather can be completely removed from the base portion when accessing the storage device 10.

Figures 2, 4:
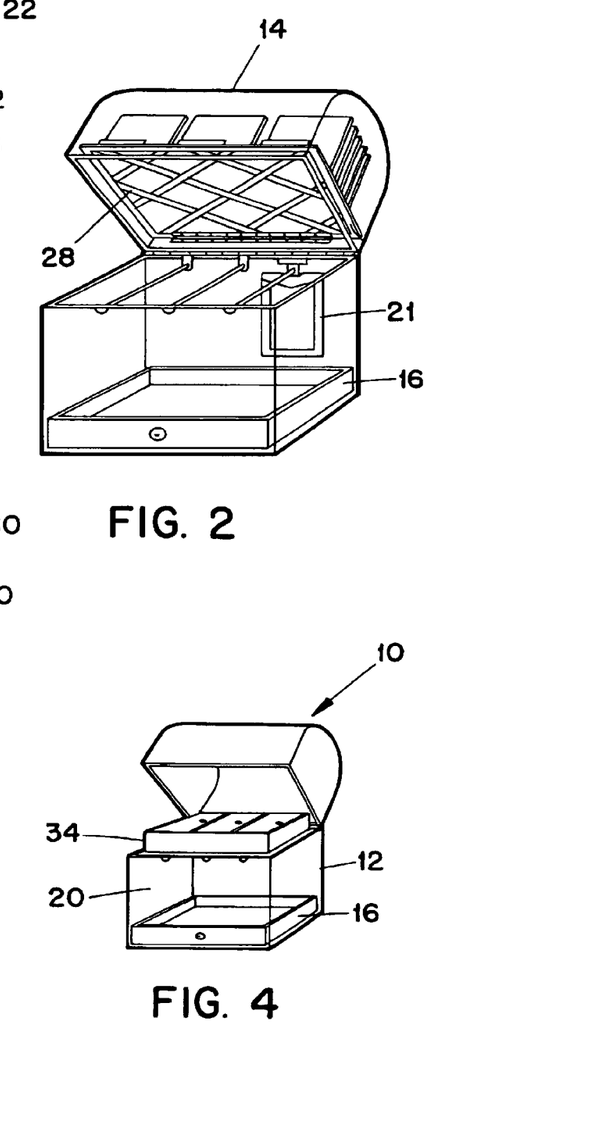
FIG. 2 is a perspective view of the first embodiment of the storage device of the present invention with the third storage section raised into the lid of the storage device.
FIG. 4 is a perspective view of a third embodiment of the storage device of the present invention.

With reference to FIGS. 1 and 2, the storage device 10 includes first, second and third storage sections for storing various items. In particular, a first storage section 16 is disposed at a base portion 12 of the storage device 10. The first storage section 16 is preferably sized to extend across substantially the entire width and depth of the storage device 10 to maximize the space therein, so that larger items can be placed therein. The height of the first storage device 16 may be dimensioned so that the drawer is not too tall to interfere with a second storage section 20, which is described in more detail below.

Preferably, the drawer is sized to be approximately 2" in height by 18.5" in width by 12" in diameter. However, the first storage device 16 may be smaller in width and depth, depending on design preference. Likewise, the first storage device 16 may taller or shorter in height, depending on design preference. In the preferred embodiment, the first storage section 16 is a drawer for holding relatively large planar items, such as 8×10 photographs, certificates, marriage licenses and the like. First storage section 16 is designed for storing relatively flat items.

The second storage section 20 is also disposed in the base portion 12 of the storage device 10, above the first storage section 16 but below the lid 14 of the storage device 10. Preferably, the second storage section 20 is disposed at an upper end of the base portion 12. The second storage section 20 includes at least one support member 18 for suspending and storing hanging pouches 21, as shown in FIG. 2. In the preferred embodiment, there are three support members 18. However, there may be as few as one support member, and as many as desired, depending on design preference. Preferably, each support member 18 is designed to hold up to 20–24 pouches. However, more hanging pouches 21 can be accommodated for larger models or less for smaller models.

Disposed above the second storage section 20 is a third storage section 22. Preferably, the third storage section 22 is used to store and organize recorded media, such as CDs, tapes, VCR tapes and the like. However, the third storage section 22 may also be used to store other items, depending on design preference. The third storage section 22 allows for items to be stored within the lid 14 of the storage device 10. That is, the lid 14 is preferably shaped and dimensioned to accommodate items that are stored in the third storage section 22 when the lid 14 is closed.

According to the first embodiment of the present invention, the third storage section is a hinged lid 22 as shown in FIGS. 1 and 2. As shown in FIG. 2, the hinged lid 22 may be connected via the hinges to the lid 14. The upper surface 24 of the hinged lid 22 preferably includes notches 26 for holding photo CD's. However, it should be understood that other devices for holding recorded media may be placed on the upper surface 24 of the lid 22. In addition, the lid 22 may include striations 28 on its lower surface, as shown in FIG. 2, which can hold additional photographs, baseball cards, postcards or other relatively flat display items. Optionally, the lower surface of the hinged lid may be fabric padded. In the preferred embodiment, the hinged lid 22 can be lifted together with the lid 14 of the storage device 10, so that the second storage section 20 may be accessed when the lid 14 is opened, as shown in FIG. 2.

Figure 3:
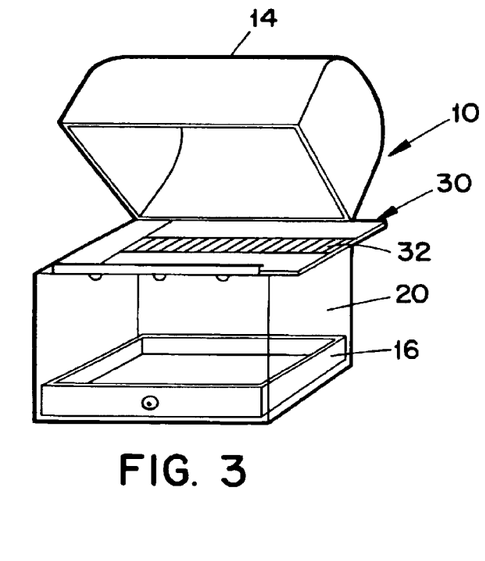
FIG. 3 is a perspective view of a second embodiment of the storage device of the present invention.

With reference to FIG. 3, a second embodiment of the storage device of the present invention is illustrated. The structure and function of the first and second storage sections of the second embodiment are identical to the first and second storage sections of the first embodiment. Therefore, a description of these features have been omitted. According to a second embodiment, the third storage section is a slidable lid 30. The slidable lid 30 is movable between an opened and closed position, so that hanging items (not shown) may be accessed from the second storage device. Preferably, the slidable lid 30 includes notches 32 at its top for holding recorded media. The lid 30 is slidable on the storage device 10 by way of complimentary groove and tongue attachment features (not shown). These features are common in the art, and therefore have not been described in detail.

With reference to FIG. 4, a third embodiment of the storage device of the present invention is illustrated. The structure and function of the first and second storage sections of the third embodiment are identical to the first and second storage sections of the first embodiment. Therefore, a description of these features have been omitted. According to a third embodiment, the third storage section is a tray 34 placed at an upper end of the base portion 12 of the storage device 10. Preferably, a peripheral lip (not shown) is disposed around an inner edge of the upper portion of the base portion 12 to support the tray 34 thereon. The tray 34 is sized to approximately fit on the upper lip so that it does not fall into the base portion 12. However, it should be understood that tray 34 may be supported by other devices, as known in the art.

Preferably, the tray is made of the same material as the trunk. For example, the tray may be made from wood or wood-like material, such as MDF. However, it should be understood that the tray may be made of other materials, depending on design preference and application.

In order to access the second storage section which is disposed beneath the tray 34, the tray 34 is simply lifted off the upper portion of the base portion 12 (not shown). Preferably, the tray 34 is designed to hold videotapes. However, it should be understood that tray 34 may hold other items, such as CD's, audio tapes, and the like. In addition, tray 34 may hold other types of items or memorabilia that may be too bulky to be accommodated in the drawer 16.

Figure 5:
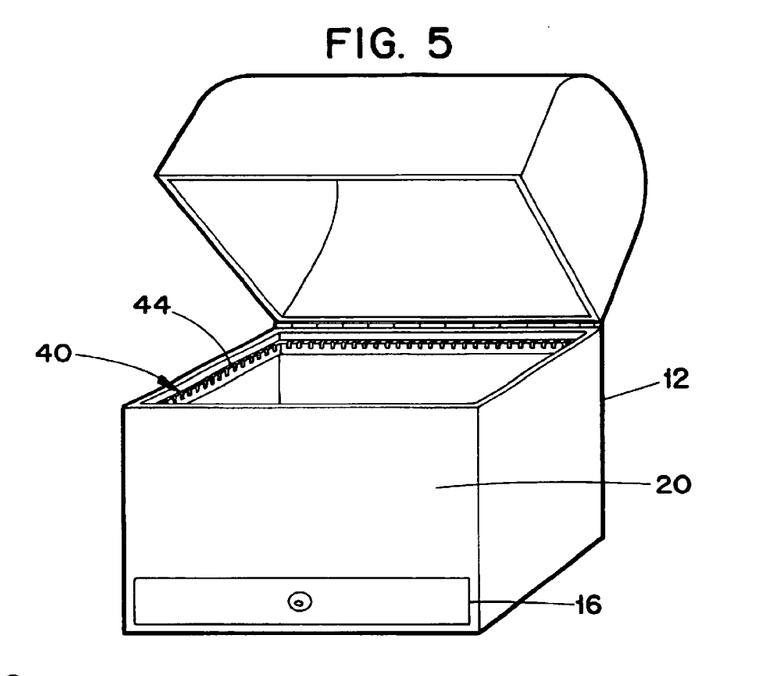
FIG. 5 is a perspective view of a fourth embodiment of the storage device of the present invention.
Figure 6:
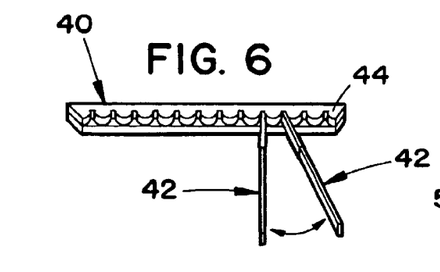
FIG. 6 is a partial perspective view of the second storage section of the fourth embodiment of the storage device of the present invention.
Figure 7:
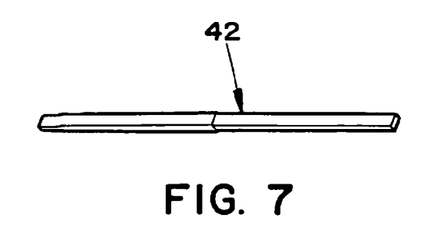
FIG. 7 is a perspective view of the telescoping rails to be used in connection with a fourth embodiment of the storage device of the present invention.

With reference to FIGS. 5–7, a fourth embodiment of the storage device of the present invention is illustrated. The structure and function of the first storage section of the fourth embodiment is identical to the first storage section of the first embodiment. Therefore, a description of these features have been omitted. According to a fourth embodiment, the second storage section 20 includes a scalloped rail 40 disposed about an inner peripheral edge of the upper end of the base portion 12. Preferably, the scalloped rail 40 is disposed around the entire edge. However, it should be understood that the scalloped rail 40 may be placed only at discrete locations along the inner peripheral edge of the base portion 12.

The scalloped rails 40 according to the fourth embodiment are designed to accommodate conventional as well as lateral and diagonal rail configurations. Preferably, there is notching approximately ever 2" to allow for maximum number of rail spacings to suit most storage situations. However, it should be understood that other spacing may be used, depending on design preference. The notched rail, or rack, may be made from rubber.

With reference in particular to FIGS. 6 and 7, preferably a telescoping rail 42 is used in connection with the scalloped rail 40. The telescoping rail 42 allows the rail to be placed laterally or diagonally along different lengths. Thus, the telescoping rails 42 can be used at any location along the scalloped rail, telescopically adjusting to span any direction. The telescoping rails 42 are designed to integrate with a maximum number of scalloped notches to create a storage environment that best suits any purpose.

In addition, the upper surface 44 of the scalloped rail (FIGS. 5 and 6) acts as a lip to hold a tray 34, as shown in FIG. 4. However, it should be understood that other types of third storage devices may be used in connection with this embodiment, including the hinged lid 22 of FIGS. 1 and 2, and the slidable lid 30 of FIG. 3.

Figure 8:
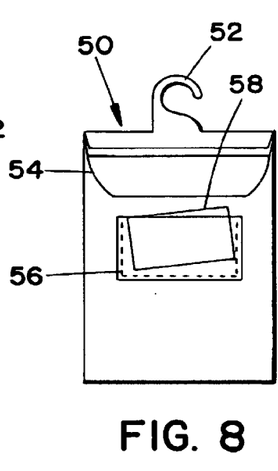
FIG. 8 is a front elevational view of a storage pouch to be used in connection with the storage device of the present invention.
Figure 9:
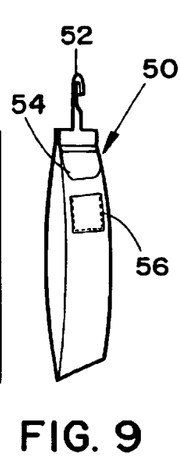
FIG. 9 is a side perspective view of the storage pouch to be used in connection with the storage device of the present invention.

With reference to FIGS. 8 and 9, hanging pouches 50 to be used in connection with the telescoping rails 42 of FIGS. 5–7 and the support members 18 of FIG. 2 are illustrated. As described above, the hanging pouches are used to store and protect various items, including but not limited to photographs, collectables, and keepsakes. The hanging pouch 50 may be designed to be gusseted on the sides for storing thicker items or produced flat to hold thinner items, such as a CD. However, it should be understood that the hanging pouch 50 may take numerous forms, depending on design preference and application.

The hanging pouch 50 includes a hook portion 52 for hooking onto the support members, as shown in FIG. 2. The hook portion 52 may be either permanently attached to the hanging pouch 50, such as by adhesive, or the like, or may be removably attached to the pouch, such as by way of snaps, and the like.

Preferably, the pouch portion is made from a re-useable polyethylene or textured or non-textured woven fabrics, or a combination of these materials. For example, a fabric pouch may be lined with Mylar or polyethylene for long-term, acid free photo storage protection, which provides superb photo, memorabilia and CD storage. Fabrics include, but are not limited to tapestry fabrics, linen, denim, and toile. However, it should be understood that other materials may be used for the pouch.

Preferably, the hook portion 52 is made from a mixed metal alloy, nylon, plastic, brass, chrome, steel, or almost any tarnish free metal or steel material. The hook portion 52 may be made by machining or injection molding, depending on the particular material used for its construction. However, it should be understood that the hook portion may be made of other material, depending on design preference and application.

The hanging pouch 50 may be made in a variety of sizes. Preferably, there are at least four different sized pouches—a large, medium, small, and CD sized pouch. Preferably, the large hanging pouch is sized to be about 8.75"×11.5". A large sized pouch can hold 8.5"×11" photographs, stamp collection sheets, coin collection sheets, warrantees, certificates, documents, and/or diplomas. A medium sized pouch is sized to be about 5.25"×7.25". The medium sized pouch can hold photograph envelopes, 5"×7" photographs, recipes, sewing patterns, jewelry, and/or software. A small sized pouch is preferably sized to be about 4"×5". The small sized pouch is sized to hold small photographs, trading cards, business cards, jewelry, and/or small collectibles. Finally, a CD sized pouch is preferably sized to be about 5" by 5". It is designed to store CD's, DVD's, and/or software. It should be understood that other sized pouches are considered to be within the scope of this invention. In addition, any combination of pouches may be used in a storage device.

The hanging pouches 50 may also include a window 56 for placing a label 58 therein. This allows each pouch 50 to be individually labeled to identify and personalize pouch contents. In addition, each pouch 50 may include complimentary Velcro portions (not shown), which allow the a flap 54 of the pouch 50 to be easily opened and closed.

Figures 10, 11A, 11B, 12:
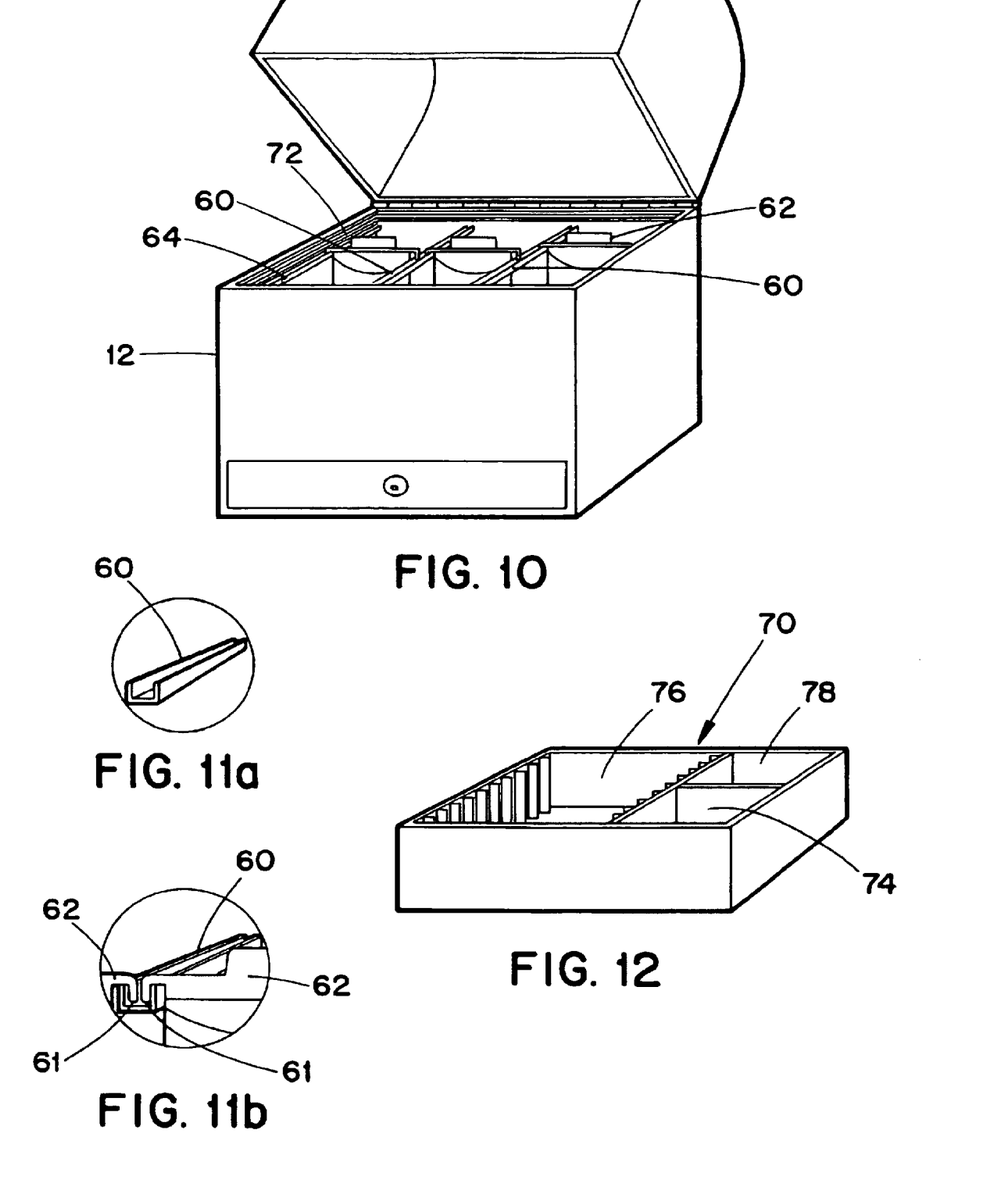
FIG. 10 is a perspective view of the fifth embodiment of the storage device of the present invention.
FIG. 11a is a perspective view of the support members of the fifth embodiment of the storage device of the present invention.
FIG. 11b is a perspective view of the support members of the fifth embodiment of the storage device of the present invention supporting ends of adjacent pouches.
FIG. 12 is a perspective view of a media tray to be used in the third storage section of the fifth embodiment of the storage device of the present invention.

With reference to FIGS. 10–12, a fifth embodiment of the present invention is illustrated. According to a fifth embodiment, the support members of the second storage section are shaped as C-channel rails 60, as shown in FIGS. 10–11. The C-channel rails 60 allow for hooked ends 61 of adjacent pouches 62 to be held therein, as shown in more detail in FIG. 11b. As such, two rails 60 are required to suspend the hanging pouch 62 according to the fifth embodiment. In addition, each peripheral side edge of base portion 12 includes a C-channel rail 64 for holding hooked ends 61 of the pouches 62 that are adjacent the edge of the storage device. In the preferred embodiment, there are four C-channel rails 64. However, it should be understood that there may any number of rails, depending on design preference.

With reference to FIG. 12, a tray 70 is shown to be used in connection with the fifth embodiment of the present invention. The tray 70 is preferably sized to be accommodated on an upper lip 72 of the base portion 12 of the storage device, as shown in FIG. 12. The tray 70 is sized to approximately fit on the upper lip 72 so that it does not fall into the base portion 12. However, it should be understood that tray 70 may be supported in other ways, as described above in connection with tray 34.

Like tray 34, tray 70 is simply lifted off the upper portion of the base portion 12 (not shown) to access contents of the second storage section. Preferably, the tray 70 includes slots to hold various types of recorded media, such as audio tapes in space 74, video tapes in space 76, and CDs and DVDs in space 78. However, it should be understood that tray 70 may hold other types of items or memorabilia.

Figure 13:
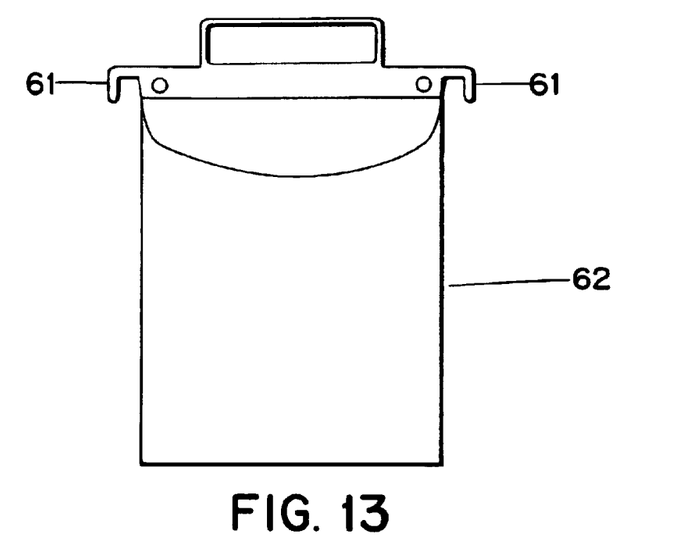
FIG. 13 is a front elevational view of an alternative embodiment of a storage pouch to be used in connection with the fifth embodiment of the storage device of the present invention.
Figure 14:
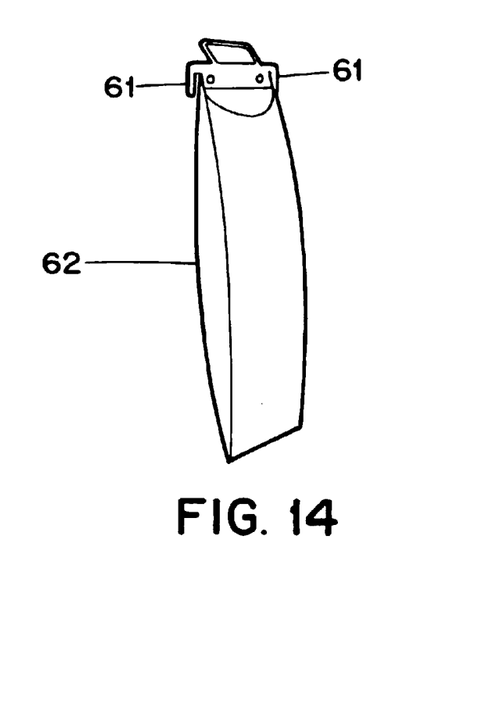
FIG. 14 is a side perspective view of the alternative embodiment of a storage pouch to be used in connection with the fifth embodiment of the storage device of the present invention.
Figure 15A:
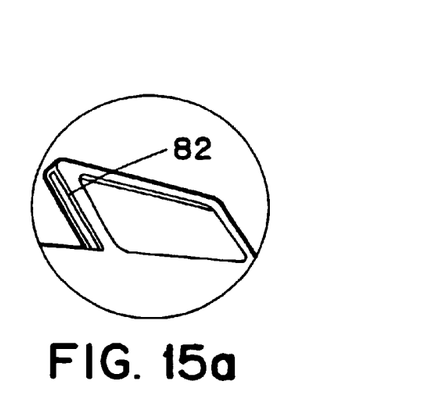
FIG. 15a is a partial perspective view of the upper portion of the storage pouch according to FIGS. 13 and 14.
Figure 15B:
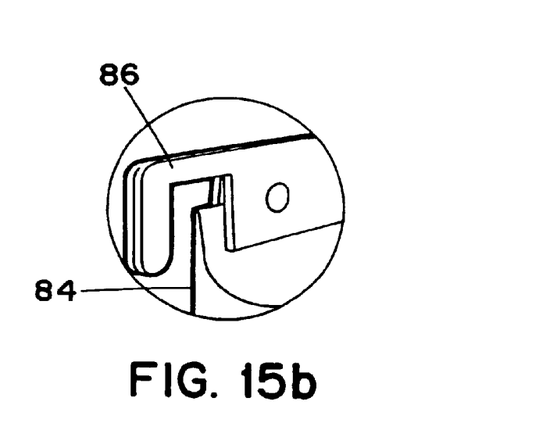
FIG. 15b is a partial perspective view of a side portion of the storage pouch according to FIGS. 13 and 14.

With reference to FIGS. 13–15, the hanging pouch 62 used in connection with the fifth embodiment will be described in more detail. As described above, the hanging pouch 62 includes two hooked ends 61, which are to be supported by C-channel rails, as shown in FIG. 10. With reference in particular to FIG. 15a, a slot 82 is provided for inserting a label. This allows the pouches 62 to be personalized and easily identifiable.

With reference in particular to FIG. 15b, the pouch 62 may be formed of two separate parts, an envelope 84 for holding items and the tab portion 86 for suspending the pouch 62. Preferably, the envelope 84 is made of similar materials as described above in connection with pouch 50. However, the envelope 84 remains closed by way of the tab portion 86 itself. In particular, the tab portion 86 includes two opposing portions that are spring loaded, that keep the envelope 84 held therein.

Figure 16A:
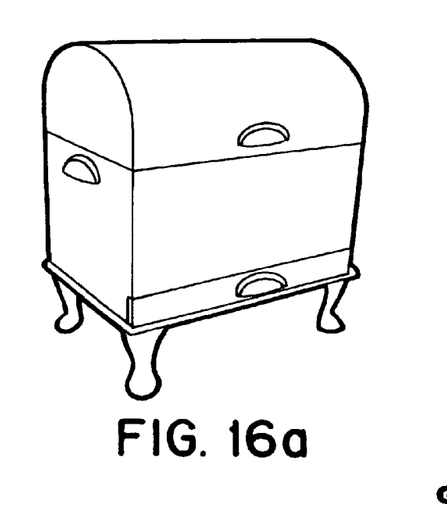
FIGS. 16a–16e are perspective views of various types of storage devices of the present invention.
Figure 16B:
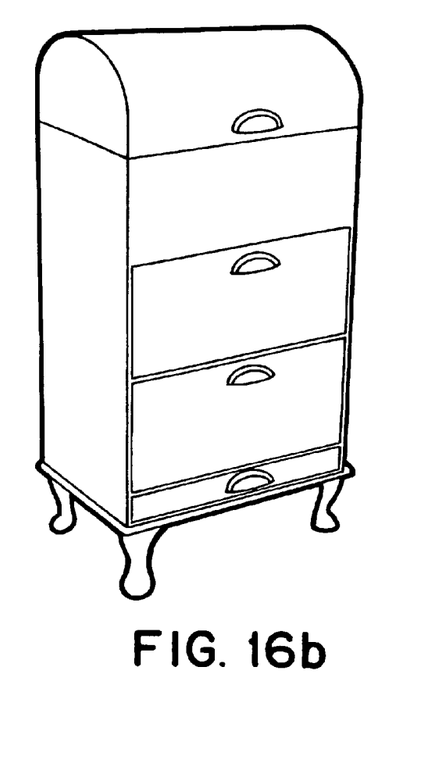
Figure 16C:
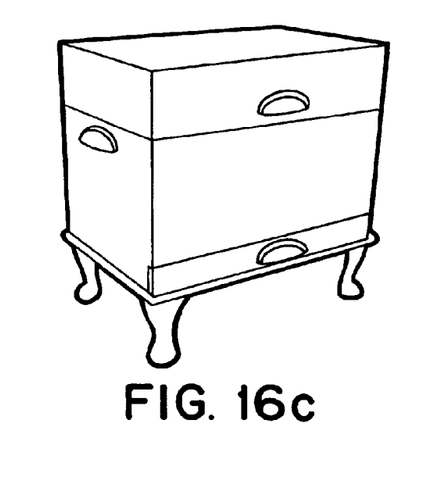
Figure 16D:
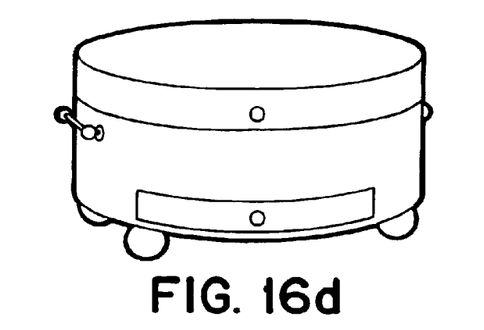
Figure 16E:
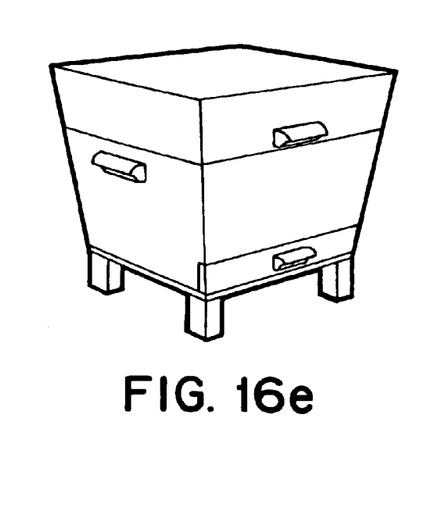

With reference to FIGS. 16a–16e, configurations of the storage device of the present invention will be described in more detail. In particular, the storage device of the present invention may take various forms. For example, FIG. 16a shows a steamer trunk, FIG. 16b shows a cabinet trunk, FIG. 16c shows a stage trunk, FIG. 16d shows a hatbox trunk, and FIG. 16e shows a tapered trunk. However, the storage device of the present invention may take numerous other forms, depending on design preference.

Figure 17:
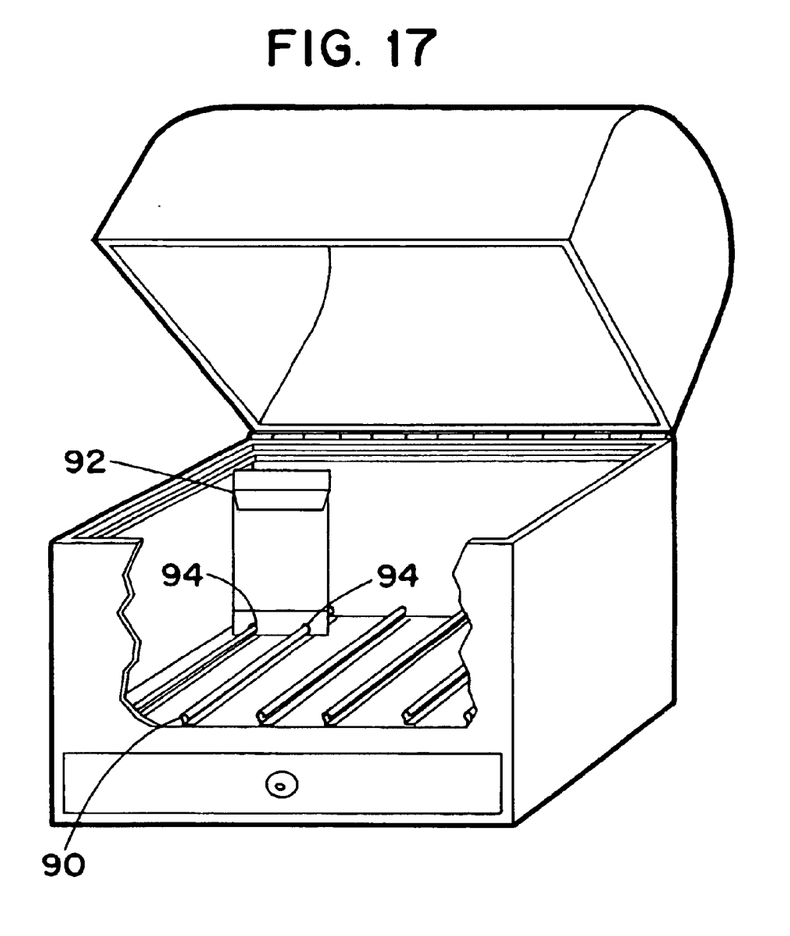
FIG. 17 is a perspective view of alternative embodiment of the support rails of the present invention.

With reference to FIG. 17, an alternative embodiment of the second storage section is shown. In particular, support rails 90 are disposed at the bottom of the second storage section. Preferably, two rails 90 are provided for each pouch 92. In turn, each pouch 92 is provided with two apertures 94 at its base, for sliding onto the rail 80. Preferably, pouches 92 are similar in construction and design to the pouches described above.

Figure 18:
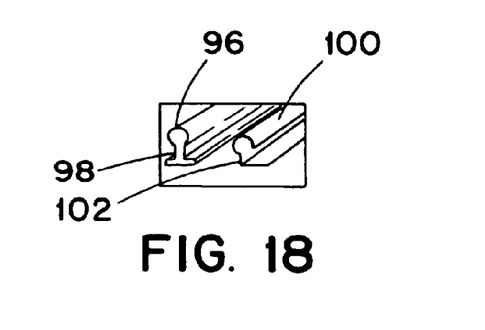
FIG. 18 is a perspective view of support rails of the present invention.

With reference to FIG. 18, the rails 90 may be made from plastic or metal, and may take various forms and shapes. For example, the rails 90 may include a circular top portion 96 and a narrow bottom portion 98. Alternatively, the rails 90 may include a partially curved upper section 100 and a narrower section 102. However, it should be understood that the rails 90 may take other forms and shapes, depending on design preference and application.

Thus, the present invention provides a decorative yet functional heirloom product for permanent storage of photographs. It allows for other items, such as recorded media, memorabilia, keepsakes and the like to be organized and stored on a permanent basis. In addition, it should be understood that the various storage features described herein can be applied to other types of storage devices.

Although the present invention has been described with reference to certain preferred embodiments, it is apparent that modifications and variations thereof may be made by those skilled in the art without departing from the scope of the invention as defined the following claims.

What is claimed is:

1. A multi-compartment storage device, comprising:
   a first storage section disposed at a base of the device;
   a second storage section for storing hanging items being disposed adjacent and above the first storage section in a first direction and defining a second storage area, said second storage section including at least one support member for suspending the hanging items; and
   a third storage section disposed adjacent and above said second storage section in the first direction and being defined by a first lid and a second lid, the first lid being adjacent and above the second storage area in the first direction and the second lid being adjacent and above the first lid in said first direction, the first lid and the second lid having a cross sectional area in the first direction and a cross sectional shape in the first direction that is similar to a cross sectional area and shape of the second storage area in the first direction, the first and second lids being independently movable with respect to one another.

2. The storage device of claim 1, wherein the first storage section is a drawer.

3. The storage device of claim 1, wherein the at least one support member is a telescoping rail.

4. The storage device of claim 1, wherein the second storage section includes a notched rack for suspending the at least one support member.

5. The storage device of claim 4, wherein the notched rack is disposed along an inner perimeter of said second storage section.

6. The storage device of claim 4, wherein the notched rack is made of rubber.

7. The storage device of claim 4, wherein notches on said notched rack are scallop-shaped.

8. The storage device of claim 7, wherein telescoping rails are used to extend between two notches.

9. The storage device of claim 1, wherein the at least one support member is a C-channel rail.

10. The storage device of claim 1, wherein the second storage section includes three support members for suspending the hanging items.

11. The storage device of claim 1, further comprising a lip disposed above the second storage section, said lip for supporting a tray for holding items in the third storage section.

12. The storage device of claim 1, wherein the first lid is slidable, said first lid having notches for supporting a plate like object upright in the first direction.

13. The storage device of claim 1, wherein the third storage section is hinged.

14. The storage device of claim 13, wherein the third storage section is movable between a first position, wherein the first lid is supported adjacent to the second storage section and the second lid is open and lifted, and a second position, wherein the first lid is supported adjacent to the second lid of the storage device when the second lid is open and lifted.

15. The storage device of claim 13, wherein the first lid includes striations for supporting flat memorabilia against one of the first lid surfaces.

16. The storage device of claim 1, wherein the hanging items are pouches, said pouches including means for suspending said pouches from said at least one support member.

17. A trunk for storing items, comprising:
   a housing including a base portion and a lid portion;
   the lid portion comprising a first lid and a second lid that together define a storage area therebetween, the first lid being adjacent and above the base portion in a first direction when closed, and the second lid being adjacent and above the first lid in the first direction when closed, the first lid being rotatably connected to the second lid, and the second lid being rotatably connected to the base portion
   a drawer disposed in the base portion of the housing; and
   at least one support member for storing hanging items, said support member being disposed above the drawer and below the lid portion.

* * * * *